March 17, 1970  O. S. SCHADT ET AL  3,500,822
BLOOD PRESSURE MEASURING AND RECORDING APPARATUS
Filed Dec. 27, 1967
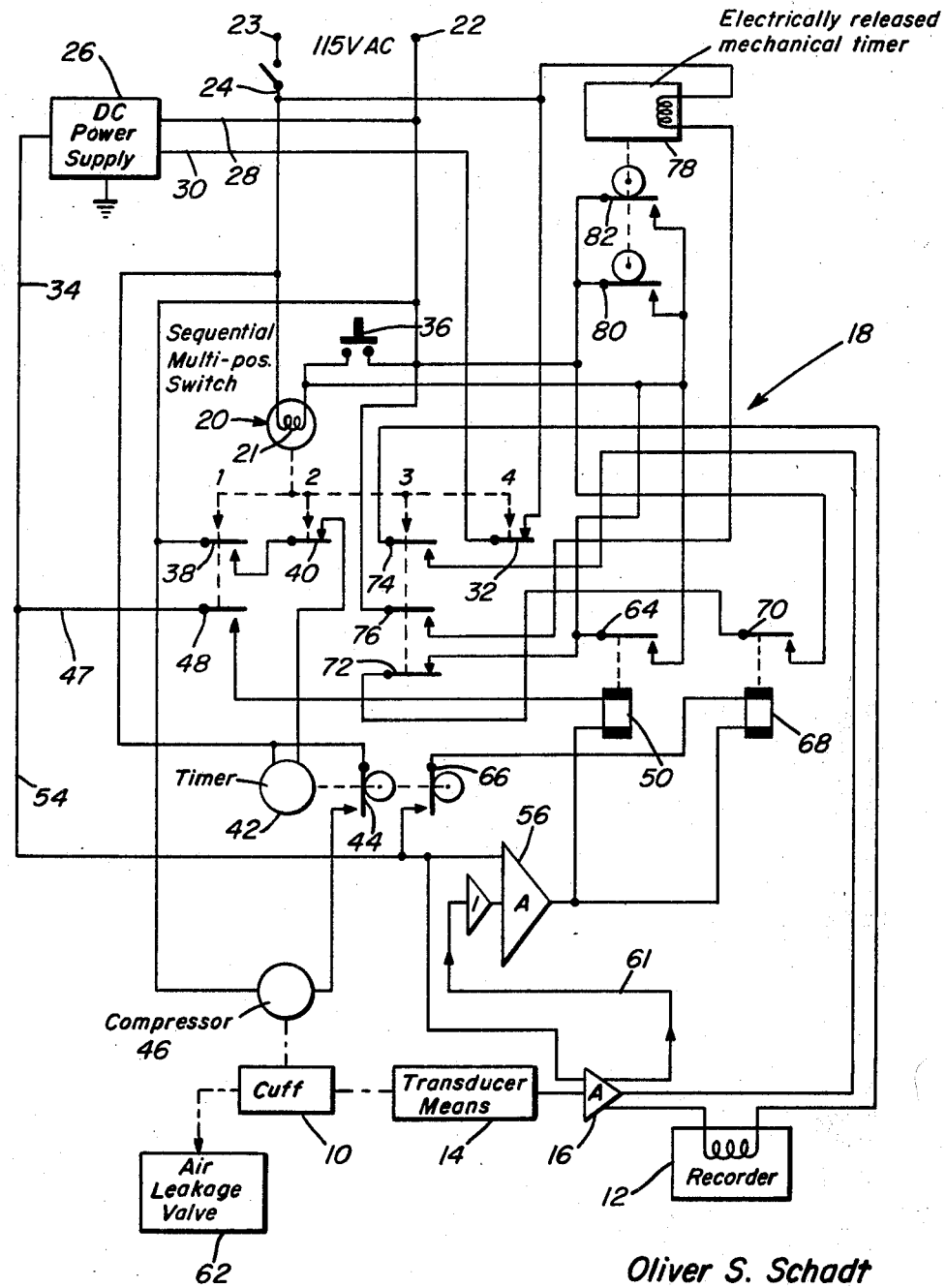
Oliver S. Schadt
Luther A. Schubert
INVENTORS.

United States Patent Office 3,500,822
Patented Mar. 17, 1970

3,500,822
BLOOD PRESSURE MEASURING AND
RECORDING APPARATUS
Oliver S. Schadt, 721 Turner, and Luther A. Schubert,
1845 29th SW., both of Allentown, Pa. 18103
Filed Dec. 27, 1967, Ser. No. 693,792
Int. Cl. A61b 5/02
U.S. Cl. 128—2.05                    9 Claims

ABSTRACT OF THE DISCLOSURE

An inflatable cuff is positioned over the brachial artery in the upper arm. A microphone is positioned underneath the cuff, the output of the microphone being connected to a recorder. A stepping switch controlled circuit causes inflation of the cuff; controlled reduction of pressure in the cuff; energization of the recorder for recording blood pressure pulse beat; and resetting of the control circuit.

---

The present invention relates to the field of blood pressure recording and more particularly to an automatic recorder for blood pressure characteristics.

The prior art has included automatic blood pressure recorders which are capable of reproducing in visual or graphic fashion, blood pressure pulses as they occur. Such a device is described in U.S. Patent No. 3,146,777, issued on Sept. 1, 1964, to A. S. J. Lee. These prior devices generally require the storage of compressed air which is employed to inflate a cuff. Further, these devices generally include a control system which is primarily dependent upon mechanical component operation including cam actuating microswitches which in turn govern the operation of solenoid valves to control the inflation of the cuff from a tank of stored compressed air. Aside from the expense involved in the required precision machining of control cams they are prone to wear after extended use causing malfunction of the tanks and frequent replacement causing inconvenience and loss of time. A further disadvantage of such prior devices resides in the unreliability of solenoid valves that become worn or stick after extended use. Precious recorded input circuits are not gated so that error may be incurred when a microphone transducer is actuated by spurious noise thereby resulting in an erroneous recordation. A still further disadvantage encountered by utilizing prior art devices resides in the necessity for manual termination of cuff inflation which detracts from a truly automatic recording system.

In summary, the present invention includes a cuff, transducer, and recorder connected in combination so that blood pressure pulsations are sensed by the transducer and suitably recorded. The present invention employs an electromagnetically operated, five position switch which sequentially actuates a control circuit establishing sequential operations in a reliable manner. The present invention also relies upon an electrically driven compressor to inflate a cuff as opposed to a compressed air tank with solenoid valve controls. In operation of the present invention the recording of pulse beats is initiated by electronically amplified blood pulse signals after the cuff has been wrapped around an arm. Thus, the recorder of the present invention will not register a recordation until triggering by a blood pulse beat occurs thus obviating erroneous recordation caused by spurious noise pick-up. The present invention is additionally convenient in requiring no manual assistance to deflate the cuff during a systolic reading because deflation is initiated automatically. Accordingly, among the salient objects of the present invention is to provide:

A blood pressure measuring and recording apparatus controlled by a sequential multi-position electromagnetic switch which sequences a control circuit through a plurality of states during a recording operation;

A compressor inflatable cuff for blood pressure recordation;

A recording means with gated input whereby said gated input is triggered by the sensing of a pulse beat.

These together with other objects and advantages which will become subsequently apparent reside in the details of construction and operation as more fully hereinafter described and claimed, reference being had to the accompanying drawings forming a part hereof, wherein like numerals refer to like parts throughout.

Referring specifically to the schematic circuit diagram of the drawing, the preferred embodiment of the present invention includes inflatable cuff 10 of conventional design which is wrapped around a patient's upper arm in a position over the brachial artery. A recorder 12 which may be an oscilloscope device or a galvanometer writer is connected to transducer means 14 which includes individual non-illustrated conventional microphone and cuff pressure transducer components. The microphone is positioned on the underside of the cuff when the same is applied to a patient's arm. Thus, pulsations and pressure characteristics sensed by the transducer means 14 are fed to the input of the recorder 12. An amplifier circuit 16 is connected serially between the transducer means 14 and the recorder 12 for boosting signal strength from the transducer means.

System operation is governed by a control circuit generally denoted by the reference numeral 18. This control circuit is capable of assuming five operational states as determined by a multi-position switch assembly 20 which sequentially steps through a plurality of positions thereof by means of triggering an electromagnetic switch actuator 21 explained hereinafter. The control circuit 18 receives AC power through power input leads 22 and 23, lead 23 including a serially connected on-off switch 24. A DC power supply 26 includes input leads 28 and 30, the former lead connected to AC lead 22, the latter lead being serially connected with the AC input lead 23 through normally closed relay contacts 32 of the switch assembly 20. Thus, during normal operation of the device the DC power supply 26 receives AC voltage and converts the same to DC voltage. The positive terminal of the power supply 26 includes a lead 34 connected thereto, which in turn is connected to the control circuit 18 as explained hereinafter. The negative supply terminal is grounded.

In order to initiate operation of the present invention, the on-off switch 24 is closed thereby energizing the power supply 26 to apply DC voltage to the control circuit. A pushbutton switch 36 is depressed so as to momentarily connect the electromagnetic switch actuator 21 in series with the AC input leads 22 and 23. The switch is thereby pulsed to a first operating position placing the control circuit in a first state accompanied by the closing of normally open relay contacts 38 which are connected in series with normally closed relay contacts 40. These closed contacts complete the connection of an electric timer 42 across the AC input leads 22 and 23. A switch 44 associated with the timer 42 is closed upon the initiation of timer operation. This switch permits completion of a circuit branch including an electrically operated compressor 46 across AC input terminals 22 and 23. The first circuit state is further characterized by closing of the normally open contacts 48 to complete a series connection from the DC voltage terminal 34 and a branch lead 47 to a relay coil 50. The current flowing through the coil 50 is limited to a value below a threshold value required to close the relay contacts 64 associated with the coil 50. Thus, the current flowing through the relay coil 50 may be considered as a "bias." One end of a lead 54 is connected to the DC power supply lead 34, the opposite end of the lead being connected to parallel connected DC bias circuits of inverter pulse amplifier 56 and amplifier 16. As the compressor 46 is operating, the cuff 10 is inflated causing pressure on a patient's arm. This cuff contains a constant operating bleed valve 62 which has been adjusted to bleed the cuff from a predetermined maximum pressure to zero pressure in approximately 15 seconds. The pressure rises above diastolic value, a pulse is sensed by the microphone portion of the transducer means 14 and a pulse signal is fed to the input of amplifier 16. The output from the amplifier 16 is connected to the input of the inverter pulse amplifier 56 by a lead 61. The inverted pulse is impressed upon the relay coil 50 thereby generating a voltage thereacross in excess of the aforementioned threshold value necessary to close the normally opened contacts 64 associated with the relay coil 50. Upon momentary closing of the contacts 64, a circuit connecting the electromagnetic switch actuator 21 across the AC voltage terminals 22 and 23 is completed thereby pulsing the switch assembly 20 to a second operating position.

The control circuit is thus sequenced to a second state causing relay contacts 40 to open from a normally closed position. The opening of these contacts breaks the aforementioned AC circuit to the timer 42. The previously closed relay contacts 38 and 48 are opened to their normal position thereby breaking the DC circuit through the relay 50. It is noted that the timer 42 is designed to retain timer switch 44 in a closed position for a delay period thereby permitting compressor 46 to operate for a period of time between one and two seconds. Thus, the compressor raises the pressure above systolic value after all pulsations have ceased. At the termination of this time, the switch 44 is opened thus deenergizing the electrical input to the compressor 46. A second timer switch 66 is closed upon the opening of the switch 44. The latter switch is connected in series with the DC lead 54 and a relay coil 68. A current return from the relay coil 68 is connected to the output of the inverter pulse amplifier 56. Thus, it will be appreciated that a DC "bias" current is provided for the relay coil 68. This "bias" current being of a value below a threshold value required to close contacts 70 associated with the relay coil 68. Thus, when the microphone again picks up a pulse after the compressor has stopped and pressure returns to systolic value, the pulse signal is amplified by amplifier 16 then inverted and amplified by the inverter pulse amplifier 56. The output of this latter amplifier is connected to the coil 68 and provides a pulse sufficient to exceed the threshold current value required to close the associated contacts 70. Upon closing of the contacts 70 the switch actuator 21 becomes connected across the AC input leads 22 and 23 thereby pulsing the sequential switch to a third position.

The acquisition of the new position by the switch 20 establishes a third circuit state. Switch 20 causes the opening of normally closed relay contacts 72 which are serially connected with the switch actuator 21 through relay contacts 70. The opening of the relay contacts 72 prevent erroneous pulsing of the switch to a succeeding state. This state is further characterized by the closing of normally open relay contacts 74 which are serially connected in the output circuit of the recorder 12. It will be appreciated that prior to the third state, no recordation of pulse beats can be effectuated. The closing of contacts 74 completes the circuit between amplifier 16 and the recorder which may typically be the stylus of a galvanometer writer or the input of an oscilloscope. As previously mentioned, the transducer means 14 includes a conventional pressure transducer (not shown) which provides the value of cuff pressure during recordation of pulse beats. Recordation of course begins with the systolic pressure being recorded. It will be appreciated that the microphone transducer portion of the transducer means 14 provides a triggering mechanism for recording this blood pressure followed by recordation of the pulse rate. The third circuit state is further characterized by the closing of normally opened relay contacts 76 which completes a circuit between suitable electrically actuated mechanical timer 78 and the AC input terminals 22 and 23. The last pulse of sufficient strength to cause recordation would be what medical practitioners refer to as the diastolic blood pressure. In a predetermined time, the timer 78 causes the closing of a normally opened switch 80 which momentarily connects the switch actuator 21 with the AC input terminals 22 and 23 thereby triggering the sequential switch 20 into a fourth position establishing a fourth circuit state.

The fourth state is characterized by the opening of normally closed relay contacts 32 which normally render a completed connection between the input of DC power supply 26 and the AC input terminals 22 and 23, as mentioned hereinbefore. The fourth circuit state is further characterized by a return of the relay contacts 76 to an open position thereby disconnecting the AC source to the timer 78. However, this timer includes mechanical means such as a wound spring or the like for continuing to operate the timer in its mechanical mode. At a later predetermined time interval, a switch 82 in the timer 78 is closed thereby applying an AC power path to the sequential switch actuator 21 in the same manner as discussed in connection with the closing of switch contacts 82, mentioned hereinbefore. Accordingly, the switch is triggered to a fifth position which establishes a fifth inactive state of the circuit.

This fifth state is characterized by a general deenergization and reset of the entire control circuit resulting in the configuration shown in the drawing. Thus, in order to initiate a new cycle of operation the pushbutton switch 36 must be depressed thereby recycling the control circuit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electromechanical blood pressure recorder comprising, an inflatable cuff, an electrically powered compressor for inflating said cuff, said cuff including a bleed valve for deflating the cuff from a preselected maximum pressure to a zero pressure in a preselected time interval, transducer means for sensing blood pressure pulsations, a recorder for selectively recording said pulsations, and a sequentially triggerable switch for establishing a multistate control circuit for recording blood pressure characteristics, means actuating said switch for establishing said control circuit in a first state, timer means rendered operative by the control circuit in said first state for actuating said compressor to inflate said cuff to a maximum pressure exceeding systolic value, and means actuating said switch for establishing said control circuit in a second state in response to a trigger generated by a transducer sensed blood pressure pulsation, means rendered operative by the control circuit in said second state for deenergizing said timer means terminating compressor operation and initiating controlled reduction of pressure in said cuff toward said systolic pressure value, means actuating said switch for establishing said control circuit in a third state in response to a trigger generated by a transducer sensed blood pressure pulsation at said systolic pressure value, means responsive to the control circuit in said third state for rendering said recorder operative to record said blood pressure pulsations during said controlled reduction in pressure of said cuff from the systolic pressure value, and second timing means triggering said switch for establishing said control circuit in a fourth state terminating said third state after diastolic blood pressure is recorded, said second timing means triggering said switch after a predetermined time for establishing said control circuit in a fifth state characterized by deenergization and reset of said control circuit.

2. The apparatus set forth in claim 1 wherein said first state timer means includes means for sustaining the operation thereof for a preselected time interval after second state deenergization of said timing means, said sustained operation causing a rise in pressure of the cuff above the systolic pressure value.

3. The apparatus set forth in claim 1 wherein said third state timing means includes mechanical means therein for self-sustaining the operation of said timing means for a preselected time after deenergization thereof.

4. The apparatus set forth in claim 1 wherein said recorder is adapted to produce a record of pulse beats representing a systolic reading of blood pressure terminating in said diastolic blood pressure reading, said record being a function of cuff pressure and time.

5. In a pressure recording system having an inflatable device, a bleed valve for controlled reduction in pressure of the device and means for recording pressure pulsations therein during said reduction in pressure, an automatic operating system including power operated compressor means connected to the device for inflation thereof when energized, sensing means connected to the device for detecting said pressure pulsations, means connected to the compressor means for selective energization thereof, timing means connected to the sensing means for deenergizing said compressor means in delayed response to an initial pulse detected by the sensing means to initiate said controlled reduction in pressure, and means for initiating operation of said recording means in response to a second pulse detected by the sensing means after said compressor means is deenergized.

6. The combination of claim 5 wherein said inflatable device is a cuff inflated by the compressor means to a maximum pressure exceeding a systolic blood pressure above which no pressure pulsations are detectable, said second pulse signalling a reduction in pressure of the cuff to said systolic blood pressure and said initial pulse corresponding to a diastolic blood pressure below which no pulsations are detectable.

7. The combination of claim 6 wherein the automatic operating system further includes reset means rendered operative simultaneously with the recording means for terminating operation thereof after a third pulse is recorded at a minimum pressure of the inflatable device corresponding to said diastolic blood pressure.

8. The combination of claim 5 wherein the automatic operating system further includes reset means rendered operative simultaneously with the recording means for terminating operation thereof after a third pulse is recorded at a minimum pressure of the inflatable device.

9. In a blood pressure recording system having an inflatable cuff and means for recording pressure pulsations during timed variation in pressure of the cuff, an automatic operating system including power operated compressor means connected to the cuff, means connected to the compressor means for selective energization thereof, sensing means connected to the cuff for detecting said pressure pulsations, timing means connected to the sensing means for denenergizating the compressor means in delayed response to a limit pressure pulse detected by the sensing means, and means for deflating the cuff upon deenergization of the compressor means.

References Cited

UNITED STATES PATENTS

| | | | |
|---|---|---|---|
| 2,352,874 | 7/1944 | Williams et al. | 128—2.05 |
| 2,379,573 | 7/1945 | Gilson | 128—2.05 |
| 2,827,040 | 3/1958 | Gilford | 128—2.05 |
| 3,146,777 | 9/1964 | Lee | 128—2.05 |
| 3,157,177 | 11/1964 | Smith | 128—2.05 |

ANTON O. OECHSLE, Primary Examiner

M. R. PAGE, Assistant Examiner